UNITED STATES PATENT OFFICE.

FRIEDRICH ADOLF REIHLEN, OF STUTTGART, WÜRTEMBERG, GERMANY.

ART OF MANUFACTURING FERMENTING MATERIALS.

SPECIFICATION forming part of Letters Patent No. 301,006, dated June 24, 1884.

Application filed October 24, 1883. (Specimens.)

*To all whom it may concern:*

Be it known that I, FRIEDRICH ADOLF REIHLEN, a citizen of Germany, residing at Stuttgart, in the Kingdom of Würtemberg and Empire of Germany, have invented new and useful Improvements in the Art of Manufacturing Fermenting Materials, of which the following is a specification.

This invention relates to the preparation and use of fibers for promoting fermentation in wine, beer, and other beverages, and is based upon the fact that not only the woody fibers and vegetable cellular substances in their minutest form become impregnated with fungoid growths when they are in contact with substances in a state of fermentation, but they may also be impregnated with the same growth, deriving their germs directly from the air under favorable conditions. The fibers impregnated with the said fungoid growths may be used as ferment instead of yeast, but without the disadvantages attending the use of the same, and for fermentation of all description.

According to the process heretofore in use, fermentation was promoted by the addition of yeast to sugar-containing liquids. The quality of the products of fermentation is dependent upon the action of this yeast, which contains always a varied quantity of fungoid growths, some of which are diseased, and which are the cause of a serious disadvantage, particularly in the fermentation of beer, since by adding the nitrogenous substance of the yeast to the nitrogenous substances of the wort the formation of diseased fungoid growths is promoted.

In carrying out my invention ground wood, paper, cotton, flax, hemp, and the like, whether woven as fiber or in the form of pulp, sawdust of every description, chopped hay, the skins of fruits—such as grapes and apples—and the skins of hops, potatoes, and the like can be used with advantage. To render the skins of fruits or vegetables efficient, they must in all cases be freed from their juice by means of washing and boiling the fibers thus obtained, which are firm, like wood, being reduced afterward into dust. Fibers which are of bad taste will not answer for beverages.

For the purpose of fermenting beer-wort it is necessary, first, to select suitable vegetable substances as feeding-ground for the fungoid growths; second, to fix these fungoid growths upon the material selected; third, to ferment the wort with fibers thus prepared. Among the materials which can be used the one to be preferred is that which is the cheapest in proportion to its quality, and which can be easily cleaned in order to be used again. The following will answer the purpose: woody material obtained from non-resinous trees or from straw, or next the skins of hops or of grapes which have been used in the manufacture of wine, sawdust from non-resinous wood, or chopped hay. Raw cotton, tow, jute, and fibers of agave are not favorable materials to use, as the yeast which settles upon these fibers cannot be separated so well from the same as it can be done from the fabrics woven from these fibers. The fixing of the fungoid growths is the same for all materials, and, although many of the above materials may be clean enough to receive the said fungoid growths, it is advisable that they should first be boiled with water.

If the fermentation fibers are to be used for fermenting wort, I take the fibers, wash the same, and free them from the water by pressure. I place them in a flat vessel, and pour over them a sugar containing pure and pasteurized beer, so that they are covered by this beer to the depth of about one-half inch. The flat vessel is left open, so that the fungi contained in the atmospheric air have free access to the liquid contained therein. This liquid allows the fungi to precipitate freely upon the fibers and to multiply thereon very rapidly, and said liquid protects the fibers against acetic fungi, which at a higher temperature might deposit thereon. The surface of the liquid offers another advantage—viz., that it shows, when the fibers begin to rise up, that the formation of carbonic acid has started, the carbonic acid serving to buoy up the fibers. In a short time more and more fibers rise, the mass assumes a pasty appearance, and foams when stirred, and the operation of forming the fermentation fiber is completed. From the time when a few fibers begin to rise to the time when the entire mass rises up only a few hours intervene. The temperature has great influence upon the operation. The operation is completed at a temperature of 12° centigrade in from four to five days; at a temperature of 15° centigrade in from three to four days; at a temperature of 20° centigrade in from two to three days; at a temperature of 24° centigrade in from one to one and a half day; at a temperature of 28° centigrade in from eighteen to twenty-four hours; at a temperature of 30° to 32° centigrade in from twelve to fifteen hours. Temperatures below 12° and above 32° centigrade are not favorable, and ought to be avoided.

If in the above process wort instead of pure beer should be employed, the nitrogenous substances contained in the wort would attract false fungi from the atmosphere, and an unsound fermentation fiber would be produced. The beer employed for covering the fibers in the open vessel is pasteurized in order to destroy the false fungi still present in the same. Very good beer-yeast may, however, be employed in place of pasteurized beer; but the latter is preferable. After the fermentation of the mass has been completed, as above stated, the fermentation fiber is ready for immediate use, or it can be freed from the liquid by filtration and pressure, and in this state it can be formed into packages for shipment. If desired, it can be dried before putting it up in packages; but this operation is tedious, since it must be conducted at a temperature below 40° centigrade.

When it is desired to prepare fermentation fibers for fermenting wines, fruit-wines, champagne, or effervescent beverages, the process is the same—that is to say, sugar containing wine, fruit-wine, or other liquid of the nature of the liquid which is to be fermented is poured over the vegetable fibers, and when the sugar containing wine is used and a suitable temperature is obtained the wine-fungoid growths are found in the same manner as the beer-fungoid growths already described, and the fibers can be used for fermenting wine. The use of these fermentation fibers need not further be described. Effervescing beverages are generally fermented with said fibers, either in bottles or in other suitable vessels.

The separation of the fermentation fibers from the liquid to be fermented is easily performed by placing the fibers in small bags. These bags float, being supported by the evolution of carbonic acid, whereas the nitrogenous substances produced and separated by this new ferment sink to the bottom. The fermentation fibers which are fairly clean under these circumstances, may in the majority of cases be forthwith used in the fermentation of fresh wort, as the first fungoid growths produced can be used for several fermentations, and only require a new formation from time to time. These fermentation fibers may be most advantageously used to referment either diseased wine by the addition of sugar containing wine, or of sugar, or for refermenting diseased beer by the addition of wort, and afterward clarifying the same by the said fermentation. The quantity of fermentation fibers requisite to produce fermentation of a certain quantity of fermentable liquid may be easily determined by experience. For fermenting wort, for instance, the quantity of fermentation fibers required is from two to four per cent. of the weight of the wort.

What I claim as new, and desire to secure by Letters Patent, is—

1. As a new article of manufacture, a ferment composed of a foundation of a vegetable fiber and of a deposit of fungoid growths formed on said foundation.

2. The within-described process for producing fermentation fibers by covering a vegetable foundation with a portion of the liquid for which the fermentation fiber is to be used, and then exposing such covered fiber to the atmosphere, substantially as set forth.

In testimony whereof I have hereunto set my hand in the presence of two subscribing witnesses.

FRIEDRICH ADOLF REIHLEN.

Witnesses:
W. HAUFF,
M. HAUFF.